US009960690B2

United States Patent
Matsuda

(10) Patent No.: US 9,960,690 B2
(45) Date of Patent: May 1, 2018

(54) SEMICONDUCTOR DEVICE FOR CONTROLLING POWER SUPPLY

(71) Applicant: MITSUMI ELECTRIC CO., LTD., Tokyo (JP)

(72) Inventor: Hiroki Matsuda, Zama (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days. days.

(21) Appl. No.: 15/544,293

(22) PCT Filed: Dec. 24, 2015

(86) PCT No.: PCT/JP2015/085904
§ 371 (c)(1),
(2) Date: Jul. 18, 2017

(87) PCT Pub. No.: WO2016/117270
PCT Pub. Date: Jul. 28, 2016

(65) Prior Publication Data
US 2017/0366089 A1    Dec. 21, 2017

(30) Foreign Application Priority Data
Jan. 21, 2015    (JP) .................................. 2015-009112

(51) Int. Cl.
*H02M 3/335*    (2006.01)
*H02M 1/08*    (2006.01)
(Continued)

(52) U.S. Cl.
CPC ......... *H02M 3/33507* (2013.01); *H02M 1/08* (2013.01); *H02M 1/14* (2013.01); *H02M 3/335* (2013.01); *H02M 2001/0032* (2013.01)

(58) Field of Classification Search
CPC ......... H02M 3/33538; H02M 3/33546; H02M 3/33515; H02M 3/33576; H02M 3/33553;
(Continued)

(56) References Cited

U.S. PATENT DOCUMENTS

2010/0053998 A1*   3/2010   Shimada ........... H02M 3/33507
                                            363/21.01

FOREIGN PATENT DOCUMENTS

| JP | 2001157446 A | 6/2001 |
| JP | 2008160917 A | 7/2008 |
| JP | 2010057213 A | 3/2010 |

OTHER PUBLICATIONS

International Search Report (ISR) and Written Opinion dated Mar. 8, 2016 issued in International Application No. PCT/JP2015/085904.
(Continued)

*Primary Examiner* — Timothy J Dole
*Assistant Examiner* — Bryan R Perez
(74) *Attorney, Agent, or Firm* — Holtz, Holtz & Volek PC

(57) ABSTRACT

A semiconductor device, for controlling a power supply which generates and outputs a driving pulse, includes: a clock generating circuit with an oscillating circuit in which a frequency can be changed and which generates a clock signal; a voltage/electric current control circuit which provides timing to turn off a switching element; a setting terminal to provide setting information from outside; a switch between a first power supply terminal and a second power supply terminal; and an internal power supply voltage control circuit which controls the switch. When voltage of the setting terminal is lower than a first voltage value, the device advances to a first stop mode in which output of a driving pulse is stopped. When voltage of the setting terminal is higher than the first voltage value, the device advances
(Continued)

to a second stop mode in which the output of the driving pulse is stopped.

3 Claims, 8 Drawing Sheets

(51) Int. Cl.
*H02M 1/14* (2006.01)
*H02M 1/00* (2006.01)

(58) Field of Classification Search
CPC ......... H02M 3/33507; H02M 3/33592; H02M 3/33523; H02M 3/335
USPC .. 363/18, 21.12, 21.13, 21.15, 21.16, 21.17, 363/21.18
See application file for complete search history.

(56) References Cited

OTHER PUBLICATIONS

International Preliminary Report on Patentability (IPRP) (and English translation thereof) dated Jul. 25, 2017 issued in counterpart International Application No. PCT/JP2015/085904.

\* cited by examiner

US 9,960,690 B2

SEMICONDUCTOR DEVICE FOR CONTROLLING POWER SUPPLY

TECHNICAL FIELD

The present invention relates to a semiconductor device for controlling a power supply, and specifically, a technique used effectively in a semiconductor device for control in an isolated DC power supply device including a voltage converting transformer.

BACKGROUND ART

As the DC power supply, there is an AC-DC converter which includes a diode bridge circuit which rectifies an AC power supply and an isolated DC-DC converter which steps down DC voltage rectified by the above circuit and converts the DC voltage to a DC voltage with a predetermined potential. As an AC-DC converter, for example, there is known a switching power supply device in which a switching element connected in a series with a primary side winding of the voltage converting transformer is driven on and off with a PWM (pulse width modulation) control method or PFM (pulse frequency modulation) control method to control the electric current flowing in the primary side winding so that the voltage induced to the secondary side winding is indirectly controlled.

There is also a switching control type AC-DC converter as follows. In order to control operation of a primary side, a resistance for detecting an electric current is provided in a series with a primary side switching element. Also, a terminal (electric current detecting terminal) is provided in a power supply control circuit (IC), and voltage which is converted by electric current-voltage conversion with the resistance is input in the terminal. The peak electric current of the primary winding is controlled based on the detected electric current value and the feedback voltage from the secondary side. With this, the output voltage or the output electric current of the secondary side is maintained at a certain level (see Patent Document 1).

Further, in an AC-DC converter which controls output of the secondary side in the primary side according to voltage converted by electric current-voltage conversion with the resistance for detecting the electric current and feedback voltage from the secondary side, in order to reduce switching loss and enhance power efficiency when the load is light, control is performed in a PWM method with the switching frequency fixed in the region equal to or less than the feedback voltage VFB1 and equal to or more than the VFB2, and control is performed varying the switching frequency between the VFB1 and VFB2.

PRIOR ART DOCUMENT

Patent Document

Patent Document 1: Japanese Patent Application Laid-Open Publication No. 2001-157446

DISCLOSURE OF THE INVENTION

Problems to be Solved by the Invention

However, in an AC-DC converter which performs control of output voltage according to the above-described feedback voltage-switching frequency characteristics (hereinafter referred to as FB voltage-frequency characteristics), such converters cannot handle situations such as when the user desires to change the switching frequency as measures to reduce noise or when the user desires to use a small transformer to reduce the size of the apparatus.

The present invention is conceived in view of the above problems, and the purpose of the present invention is to provide a power supply controlling semiconductor device in which the following can be performed easily, the switching frequency control characteristics can be changed with setting from outside, the switching frequency can be changed to cope with noise, and the device can be made small according to the system.

Another purpose of the present invention is to provide a technique so that the power supply control semiconductor device can set the power supply apparatus to a latch stop mode performable state or forcibly turning off the switching element with the feedback terminal voltage and further freely set from outside the value of the feedback terminal voltage which forcibly turns off the switching element.

Means for Solving the Problem

In order to solve the above problems, according to an aspect of the present invention, there is provided a semiconductor device for controlling a power supply which generates and outputs a driving pulse to control on and off of a switching element so that an electric current flows intermittently in a primary side winding of a voltage converting transformer according to a voltage in proportion with the electric current flowing in the primary side winding of the transformer and an output voltage detecting signal from a secondary side of the transformer, the semiconductor device comprising: a clock generating circuit which is provided with an oscillating circuit in which a frequency can be changed and which generates a clock signal to provide timing to periodically turn on the switching element; a voltage/electric current control circuit which provides timing to turn off the switching element based on a voltage in proportion with the electric current flowing in the primary side winding of the transformer and an output detecting signal from a secondary side of the transformer; a setting terminal to provide setting information from outside; a switch provided between a first power supply terminal to which an AC input voltage is supplied and a second power supply terminal to which a voltage induced to an auxiliary winding of the transformer is supplied; and an internal power supply voltage control circuit which controls on and off of the switch, wherein, when a voltage of the setting terminal is lower than a first voltage value set in advance, the device advances to a first stop mode in which the output of the driving pulse is stopped and the internal power supply voltage control circuit controls the on and off of the switch so that the voltage of the second power supply terminal is within a predetermined voltage range, and when the voltage of the setting terminal is higher than the first voltage value, under a condition that the output detecting signal from the secondary side is lower than a threshold which is the voltage of the setting terminal, the device advances to a second stop mode in which the output of the driving pulse is stopped.

According to the above-described configuration, without increasing the number of external terminals, the power supply control semiconductor device can be set to a first stop mode (latch stop mode performable state) or a second stop mode (gate stop mode) in which the switching element is forcibly turned off with the voltage of the feedback terminal. Further, the value of the feedback terminal voltage to forcibly turn off the switching element can be set freely from outside. Therefore, it is possible to freely choose whether to prioritize reduction of standby power consumption or reduction of output ripple depending on the applied system.

Preferably, the semiconductor device for controlling a power supply according to aspect 1 further includes a frequency control circuit which changes an oscillating frequency of the oscillating circuit according to the output detecting signal from the secondary side, wherein, the frequency control circuit is able to change output detecting signal against oscillating frequency characteristics according to the voltage of the setting terminal, in the output detecting signal against oscillating frequency characteristics, an upper limit value of the oscillating frequency for the output detecting signal is fixed to a first frequency when the voltage of the setting terminal is lower than a second voltage value (Vref2) which is higher than the first voltage value (Vref1), and the upper limit value of the oscillating frequency for the output detecting signal is fixed to a second frequency higher than the first frequency when the voltage of the setting terminal is higher than the second voltage value.

The above configuration includes an oscillating circuit in which the frequency can be varied and a frequency control circuit in which the oscillating frequency of the oscillating circuit is varied depending on the output detecting signal from the secondary side. The frequency control circuit changes the output detecting signal against oscillating frequency characteristics according to the state of the setting terminal (external resistance value). Therefore, the switching frequency control characteristics can be changed with setting from outside. With this, the switching frequency can be easily changed to cope with noise and the device can be made smaller easily according to the system.

Preferably, the semiconductor device for controlling a power supply according to aspect 2 further includes, a voltage comparator which compares a voltage corresponding to the output detecting signal with the threshold; a voltage divider which divides the voltage of the setting terminal; and a selecting unit to selectively supply to the voltage comparator either the voltage of the setting terminal or the voltage divided by the voltage dividing unit as the threshold, wherein, when a ratio of the threshold value of the output detecting signal in the first frequency and the second frequency when advancing to the second stop mode is N, the voltage divider sets a dividing voltage ratio so that the ratio between the voltage divided by the voltage divider and the voltage of the setting terminal is N.

With this, when a function to change the output detecting signal against oscillating frequency characteristics depending on the state of the setting terminal is provided, the function of the second stop mode (gate stop state) to forcibly turn off the switching element with the voltage of the feedback terminal can be implemented with a small circuit configuration and the burden of design on the designer decreases.

Advantageous Effect of the Invention

According to the present invention, the switching frequency control characteristics can be changed with the setting from outside, the switching frequency can be changed easily to cope with noise and the device can be made smaller easily according to the system in the control semiconductor device of the isolated DC power supply device which is provided with the voltage converting transformer and which turns on and off the electric current which flows in the primary side winding to control output. Further, without increasing the number of external terminals, the power supply control semiconductor device can set the power supply device to a latch stop mode performable state or forcibly turn off the switching element with the voltage of the feedback terminal and the value of the feedback terminal voltage which forcibly turns off the switching element can be set freely from outside.

EMBODIMENT FOR CARRYING OUT THE INVENTION

A preferable embodiment according to the present invention is described based on the drawings.

Figure 1:
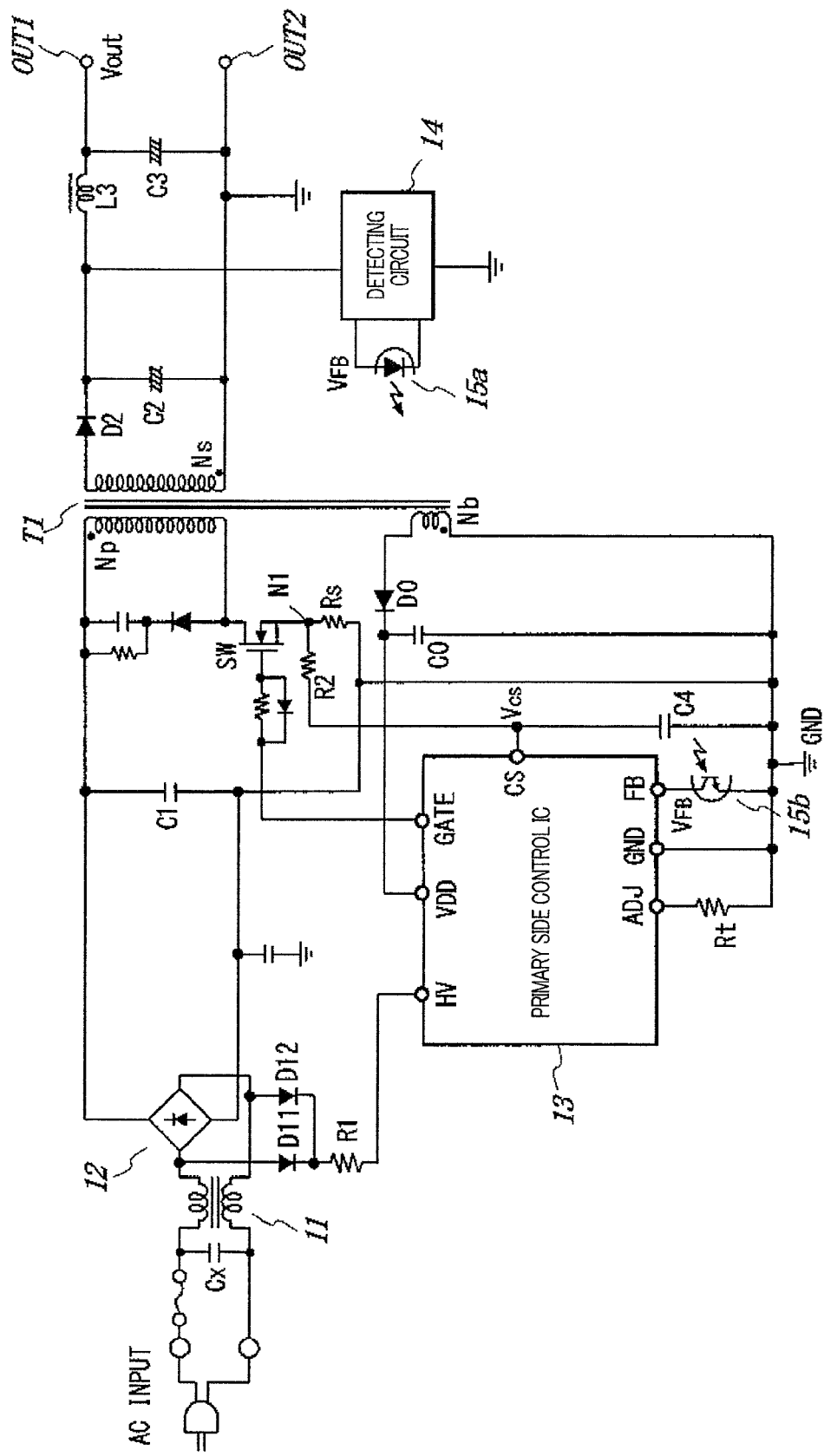
FIG. 1 is a circuit configuration showing an embodiment of an AC-DC converter as an isolated DC power supply device according to the present invention.

FIG. 1 is a circuit configuration diagram showing an embodiment of an AC-DC converter as an isolated DC power supply device applying the present invention.

The AC-DC converter according to the present embodiment includes an X capacitor Cx connected between AC input terminals to attenuate normal mode noise, a line filter 11 which cuts noise including a common mode coil, a diode bridge circuit 12 which rectifies AC voltage, a smoothing capacitor C1 which smooths the rectified voltage, a voltage converting transformer T1 including a primary side winding Np, a secondary side winding Ns and an auxiliary winding Nb, a switching transistor SW including a N channel MOSFET connected in series with a primary side winding Np of the transformer T1, and a power supply control circuit 13 which drives the switching transistor SW. According to the present embodiment, the power supply control circuit 13 is formed as a semiconductor integrated circuit (hereinafter referred to as power supply control IC) on one semiconductor chip such as single crystal silicon.

In the secondary side of the transformer T1, a rectifying diode D2 connected in a series with a secondary side winding Ns and a smoothing capacitor C2 connected between a cathode terminal of the diode D2 and another terminal of the secondary side winding Ns are provided. The electric current is flown intermittently in the primary side winding Np to induce the AC voltage in the secondary winding Ns and the AC voltage is rectified and smoothed to output the DC voltage Vout according to a winding ratio between the primary side winding Np and the secondary side winding Ns.

Further, in the secondary side of the transformer T1, a coil L3 and a capacitor C3 are provided to compose a filter which blocks switching ripple noise, etc. caused by the switching in the primary side. Further, a detecting circuit 14 which detects the output voltage Vout is provided, and connected to the detecting circuit 14, a photo-diode 15a as a light emitting side element of the photo-coupler which transmits the signal according to the detecting voltage to the power supply control IC 13 are provided. Provided on the primary side, a photo-transistor 15b is connected between the feedback terminal FB of the power supply control IC 13 and the grounding point. The photo-transistor 15b is provided as a light receiving side element which receives a signal from the detecting circuit 14.

On the primary side of the AC-DC convertor of the present embodiment, a rectifying smoothing circuit is provided, and the rectifying smoothing circuit includes a rectifying diode D0 connected in a series with an auxiliary winding Nb and a smoothing capacitor C0 connected between a cathode terminal of the diode D0 and a grounding point GND. The voltage rectified and smoothed in the rectifying smoothing circuit is applied to a power supply voltage terminal VDD of the power supply control IC 13.

The power supply control IC 13 is provided with a high pressure terminal HV on which voltage before being rectified in the diode bridge circuit 12 is applied through the diodes D11, D12 and the resistance R1. When the power supply is turned on (right after the plug is inserted), it is possible to operate with the voltage from the high pressure terminal HV.

Further, according to the present embodiment, a resistance Rs for detecting the electric current is connected between a source terminal of the switching transistor SW and a grounding point GND. Further, a resistance R2 is connected between a node N1, between the switching transistor SW and the electric current detecting resistance Rs, and an electric current detecting terminal CS of the power supply control IC 13. Further, a capacitor C4 is connected between the electric current detecting terminal CS of the power supply control IC 13 and the grounding point. A low-pass filter includes the resistance R2 and the capacitor C4.

Next, a specific configuration of the above-described power supply control IC 13 is described.

The power supply control IC 13 according to the present embodiment includes an external setting terminal ADJ for setting the switching cycle, etc. from outside. Either one of the two feedback voltage-frequency characteristics prepared in advance is selected according to the setting of the external setting terminal ADJ, and the output oscillating frequency control is performed according to the selected characteristic. Specifically, either one of the two characteristics A or B shown in FIG. 4 can be selected. This may be described as "feedback voltage" or "FB voltage" in the drawings and the description below.

According to the FB voltage-frequency characteristics A and B, when the feedback voltage VFB is VFB1 (for example, 1.8V) or lower, the PWM control is performed at the same and constant frequency such as 22 kHz in both the characteristics A and B, when the feedback voltage is VFB2 (for example, 2.1V) or more, PWM control is performed at a certain frequency such as 100 kHz in the characteristics A and a certain frequency such as 66 kHz in the characteristics B, and when the feedback voltage is between VFB1 and VFB2, the frequency is controlled to vary linearly according to the variation of the feedback voltage VFB.

The fixed frequency (22 kHz) at the above-described VFB1 (1.8V), VFB2 (2.1V), and the region VFB1 or less, and the fixed frequency (66 kHz, 100 kHz) in the region of VFB2 or more at which control is switched are merely examples, and the values are not limited to the above.

Further, the power supply control IC 13 according to the present embodiment is able to set the power supply control semiconductor device to a latch stop mode performable state or forcibly turn off the switching element with the voltage of the feedback terminal according to the voltage of the external setting terminal ADJ. According to the voltage of the external setting terminal ADJ, the value of the feedback terminal voltage which forcibly turns off the switching element can be set freely from outside. Further, a frequency selection mode is provided to select the switching frequency according to the voltage of the external setting terminal ADJ. That is, according to the present embodiment, an internal source electric current supply connected to the ADJ terminal is internally provided. Various setting is possible with the voltage of the ADJ, and the setting of the voltage can be performed by connecting an external resistance Rt with a predetermined resistance value.

Figure 2:
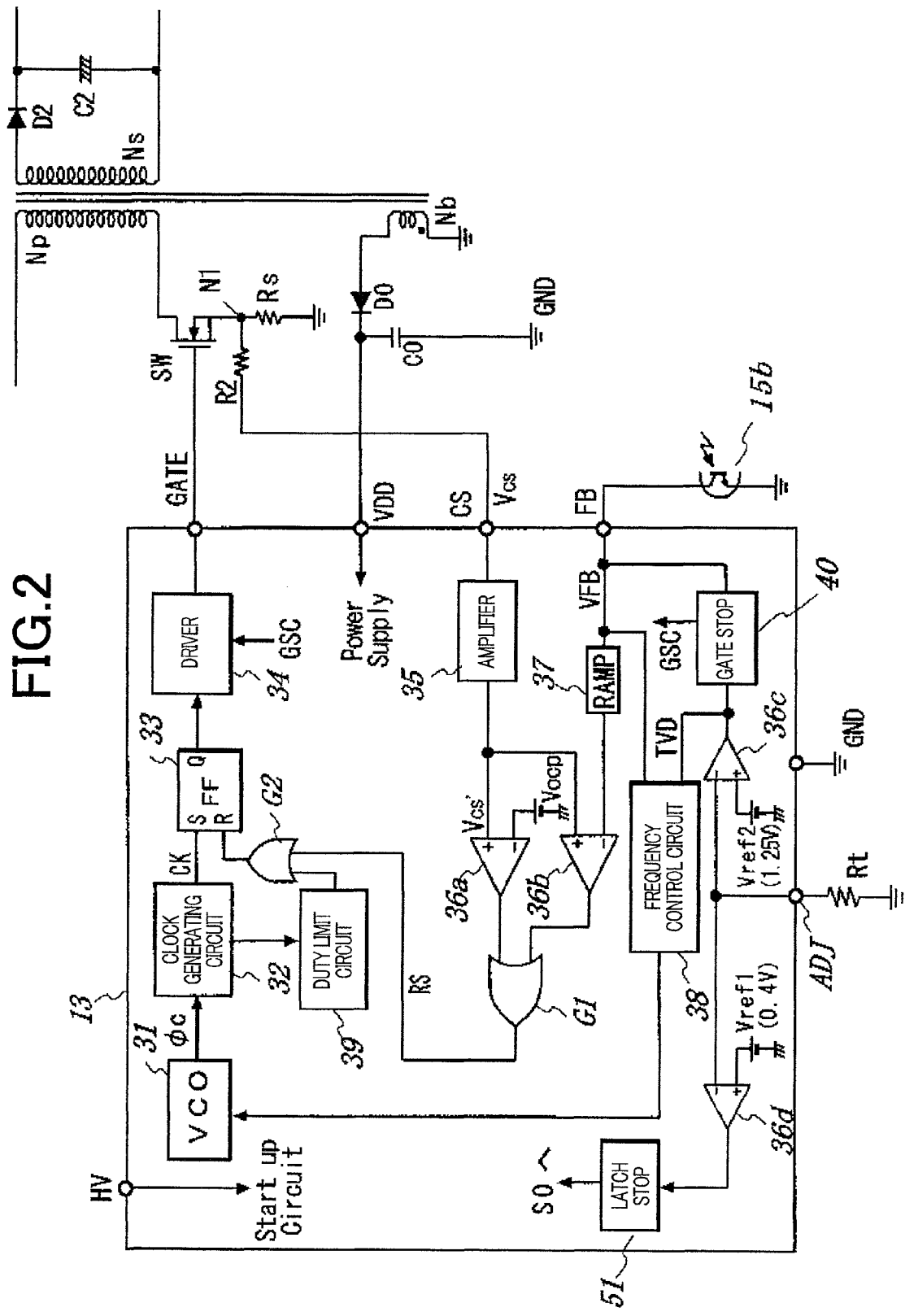
FIG. 2 is a block diagram showing a configuration example of a primary side switching power supply control circuit (power supply control IC) of a transformer in the AC-DC converter shown in FIG. 1.

FIG. 2 shows a configuration example of a power supply control IC 13 according to the present embodiment including the above-described functions.

As shown in FIG. 2, the power supply control IC 13 according to the present embodiment is provided with an oscillating circuit 31 which oscillates at a frequency according to the voltage VFB of the feedback terminal FB, a clock generating circuit 32 which includes a circuit such as a one-shot pulse generating circuit which generates a clock signal CK to provide timing to turn on the primary side switching transistor SW based on the oscillating signal c generated in the oscillating circuit 31, an RS flip-flop 33 which is set by the clock signal CK, and a driver (driving circuit) 34 which generates a driving pulse GATE of the switching transistor SW according to the output of the flip-flop 33. According to the present application, the clock generating circuit refers to a combination of the oscillating circuit 31 and the clock generating circuit 32.

Figure 3:
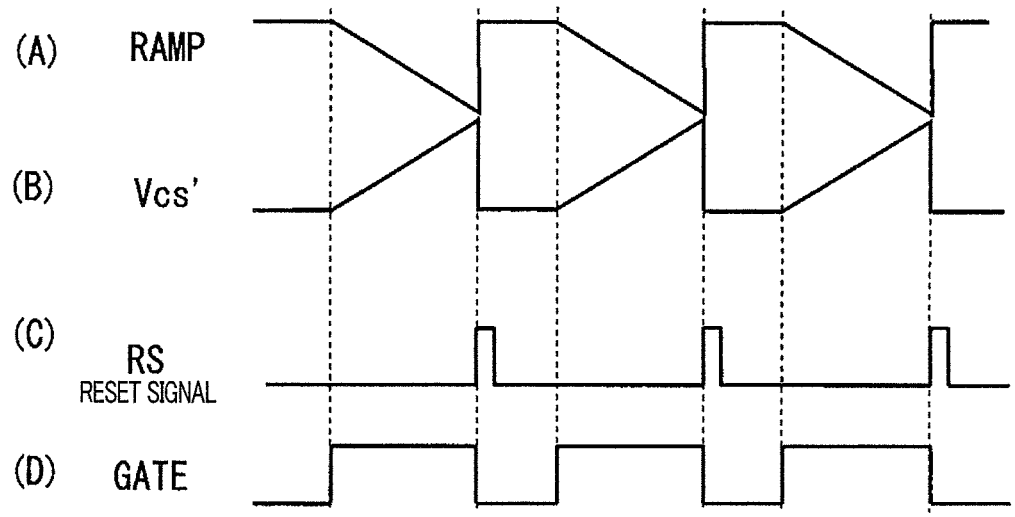
FIG. 3 is a waveform showing how voltage varies in each unit of the power supply control IC of the present embodiment.

The power supply control IC 13 includes an amplifier 35 including a non-inverting amplifying circuit which amplifies the voltage Vcs input in the electric current detecting terminal CS, a comparator 36a as a voltage comparing circuit which compares a potential Vcs' amplified by the amplifier 35 and the comparison voltage (threshold voltage) Vocp to monitor an overcurrent, a waveform generating circuit 37 which generates a voltage RAMP with a predetermined waveform as shown in FIG. 3A based on the voltage VFB of the feedback terminal FB, a comparator 36b which compares a potential Vcs' with a waveform as shown in FIG. 3B amplified by the amplifier 35 and a waveform RAMP generated by the waveform generating circuit 37, and a OR gate G1 which takes a logical sum of the output of the comparators 36a and 36b. According to the power supply control IC 13 of the present embodiment, the voltage RAMP shown in FIG. 3A is generated to decrease with a certain tilt from the FB voltage.

The output RS (see FIG. 3C) of the OR gate G1 is input to the reset terminal of the flip-flop 33 through the OR gate G2 and the timing to turn off the switching transistor SW is provided. A pull-up resistance is provided between the feedback terminal FB and the internal power supply voltage terminal and the electric current flowing in the phototransistor 15b is converted to the voltage with the resistance. The waveform generating circuit 37 is provided to cope with the sub-harmonic oscillating and the voltage VFB can be can be input in the comparator 36b directly or by a level shift.

Further, a duty limiting circuit 39 which generates a maximum duty reset signal to limit the duty (Ton/Tcycle) of the driving pulse GATE so that this does not exceed a predetermined maximum value (for example, 85% to 90% based on the clock signal CK output from the clock generating circuit 32 is provided in the power supply control IC 13 of the present embodiment. When the maximum duty reset signal output from the duty limiting circuit 39 is supplied to the flip-flop 33 through the OR gate G2 and the pulse reaches the maximum duty, reset is performed at this point so that the switching transistor SW is turned off immediately.

Figure 4:
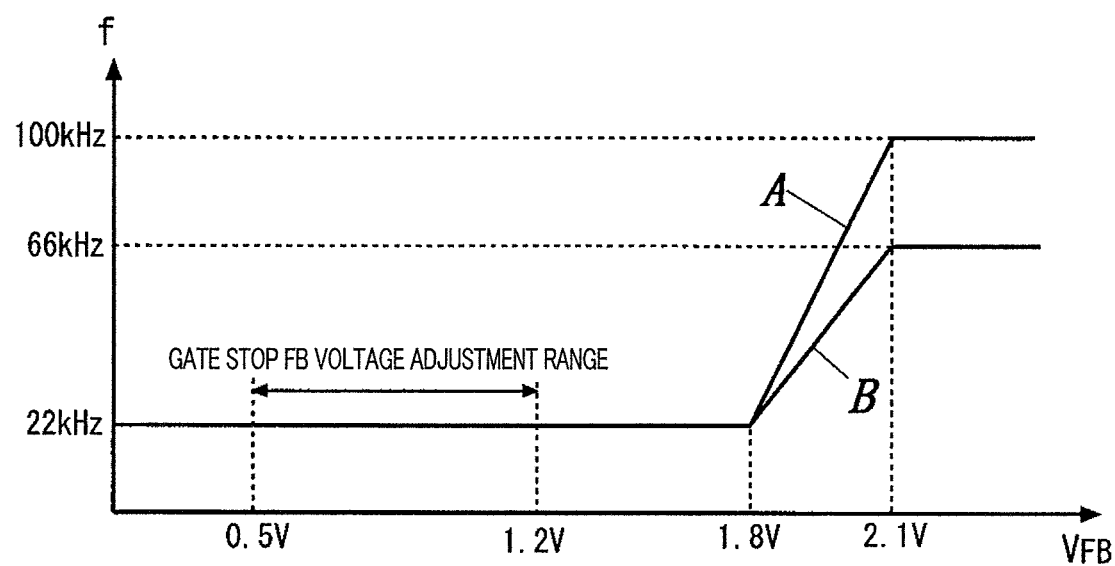
FIG. 4 is a characteristic diagram showing a relation between a switching frequency and feedback voltage VFB in the power supply control IC of the present embodiment.
Figure 6:
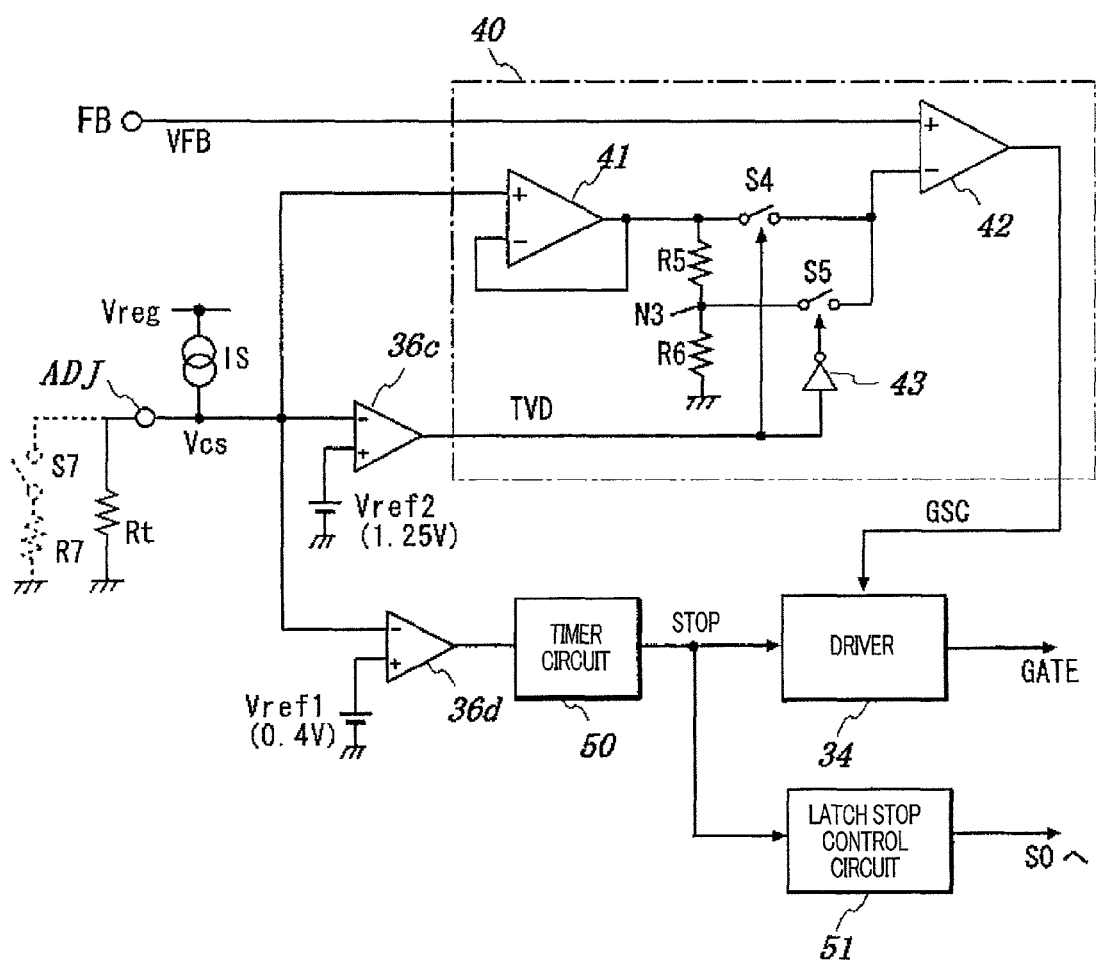
FIG. 6 is a circuit configuration showing a configuration of a gate stop signal generating circuit.
Figure 7:
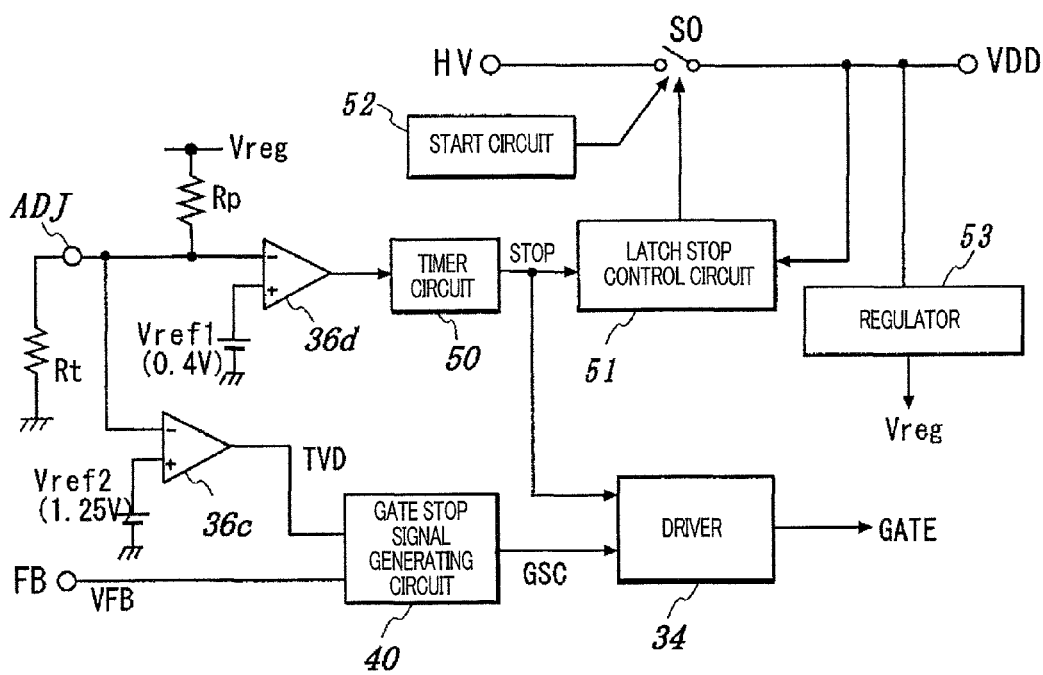
FIG. 7 is a circuit configuration showing a relation between an output driver (driving circuit) and a latch stop control circuit in a power supply control IC of the present embodiment.

The power supply control IC 13 according to the present embodiment includes a comparator 36c which compares the voltage of the external setting terminal ADJ with the predetermined threshold voltage Vref2 (for example 1.25V) and a frequency control circuit 38 which, according to the characteristics shown in FIG. 4, varies the oscillating frequency of the oscillating circuit 31, that is, the switching frequency according to the voltage VFB of the feedback terminal FB. A constant current source IS as shown in FIG. 6 or a pull up resistance Rp shown in FIG. 7 is provided between the external setting terminal ADJ and the power supply line which supplies the internal power supply voltage Vreg. The electric current flowing in the external resistance Rt connected to the external setting terminal ADJ is converted to the voltage by the resistance, and depending on whether the voltage of the external setting terminal ADJ is larger than the threshold value voltage Vref2 (1.25V), the frequency control circuit 38 switches the characteristics of the controlled oscillating frequency to A or B (see FIG. 4). With this, the user suitably selects the resistance value of the external resistance Rt connected to the external setting terminal ADJ and is able to switch the FB voltage-frequency characteristics.

Further, the power supply control IC 13 according to the present embodiment is provided with a gate stop signal generating circuit 40 which generates a signal GSC to stop the operation of the driver 34 according to the voltage of the external setting terminal ADJ and the voltage VFB of the feedback terminal FB. Further, a comparator 36d which compares the voltage of the external setting terminal ADJ with the predetermined threshold value voltage Vref1 (for example, 0.4V), and a latch stop control circuit 51 which performs control to advance to a later-described latch stop mode according to an output of the comparator 36d are also provided. Specifically, when the voltage of the external setting terminal ADJ is made lower than the threshold voltage Vref1 (0.4V), the state advances to the latch stop mode which turns off the switch S0 shown in FIG. 7.

When the voltage VFB of the feedback terminal FB becomes a predetermined voltage or lower, the gate stop signal generating circuit 40 outputs the signal GSC which stops the operation in a state with the driving pulse GATE which is the output of the driver 34 to be fixed to a low level (hereinafter referred to as gate stop), and determines the value of the feedback voltage VFB when the gate stop is performed by the voltage of the external setting terminal ADJ.

FIG. 8 shows the relation between the voltage of the external setting terminal ADJ and the operation mode in the power supply control IC 13 according to the present embodiment.

Figure 8A:
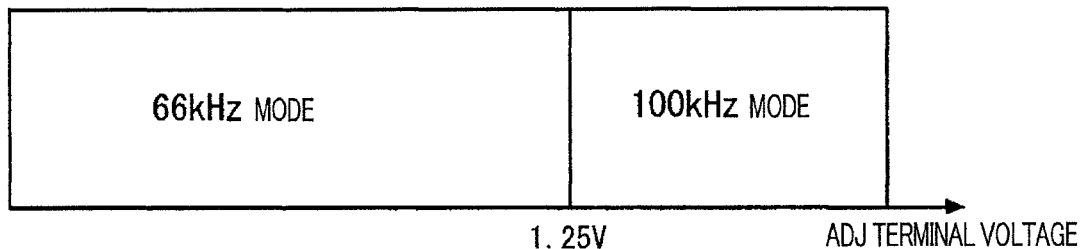
FIG. 8A is an explanatory diagram showing a relation between a voltage of an external setting terminal ADJ and an oscillating mode in a power supply control IC of the present embodiment.

The relation between the voltage of the external setting terminal ADJ and the oscillating mode of the oscillating circuit 31 is set as shown in FIG. 8A. When the voltage of the external setting terminal ADJ is higher than the threshold voltage Vref2 (1.25V), the oscillating circuit 31 operates so as to generate the oscillating signal according to the characteristics A (100 kHz mode) as shown in FIG. 4 and when the voltage of the external setting terminal ADJ is lower than the threshold voltage Vref2 (1.25V), the oscillating circuit 31 operates so as to generate the oscillating signal according to the characteristics B (66 kHz mode) as shown in FIG. 4.

Figure 8B:
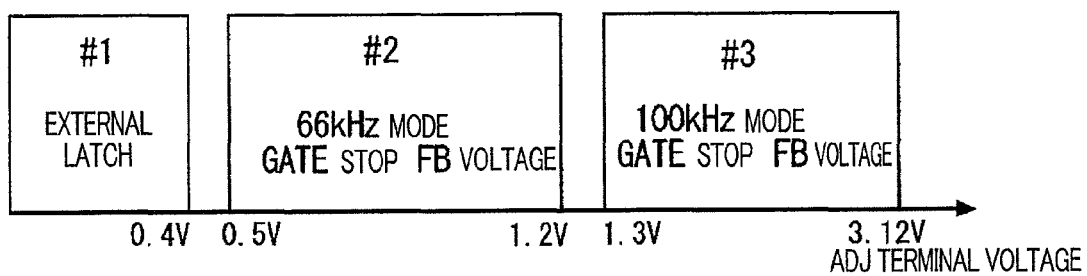
FIG. 8B is an explanatory diagram showing a relation between a voltage of an external setting terminal ADJ and a latch stop or gate stop FB voltage in a power supply control IC of the present embodiment.

The relation between the voltage of the external setting terminal ADJ and the latch stop and the relation between the voltage of the ADJ and the gate stop FB voltage are set as shown in FIG. 8B. When the voltage of the external setting terminal ADJ becomes lower than the threshold voltage Vref1 (0.4V), the power supply control IC 13 is set to the latch stop mode #1. When the voltage of the external setting terminal ADJ is within the range of 0.5V to 1.2V, if the feedback voltage VFB becomes equal to or lower than the voltage of the external setting terminal ADJ in the switching operation of the 66 kHz mode, the power supply control IC is set to the gate stop mode #2. When the voltage of the external setting terminal ADJ is within the range of 1.3V to 3.12V, if the feedback voltage VFB in the switching operation of the 100 kHz mode becomes equal to or less than 1/2.6 the voltage of the external setting terminal ADJ, the power supply control IC 13 is set to the gate stop mode #3. The upper limit value and the lower limit value of the gate stop mode #3, specifically, 1.3V and 3.12V respectively, are set to a value corresponding to 2.6 times the upper limit value and the lower limit value of the gate stop mode #2, specifically, 0.5V and 1.2V. The reason is described later.

Figure 5:
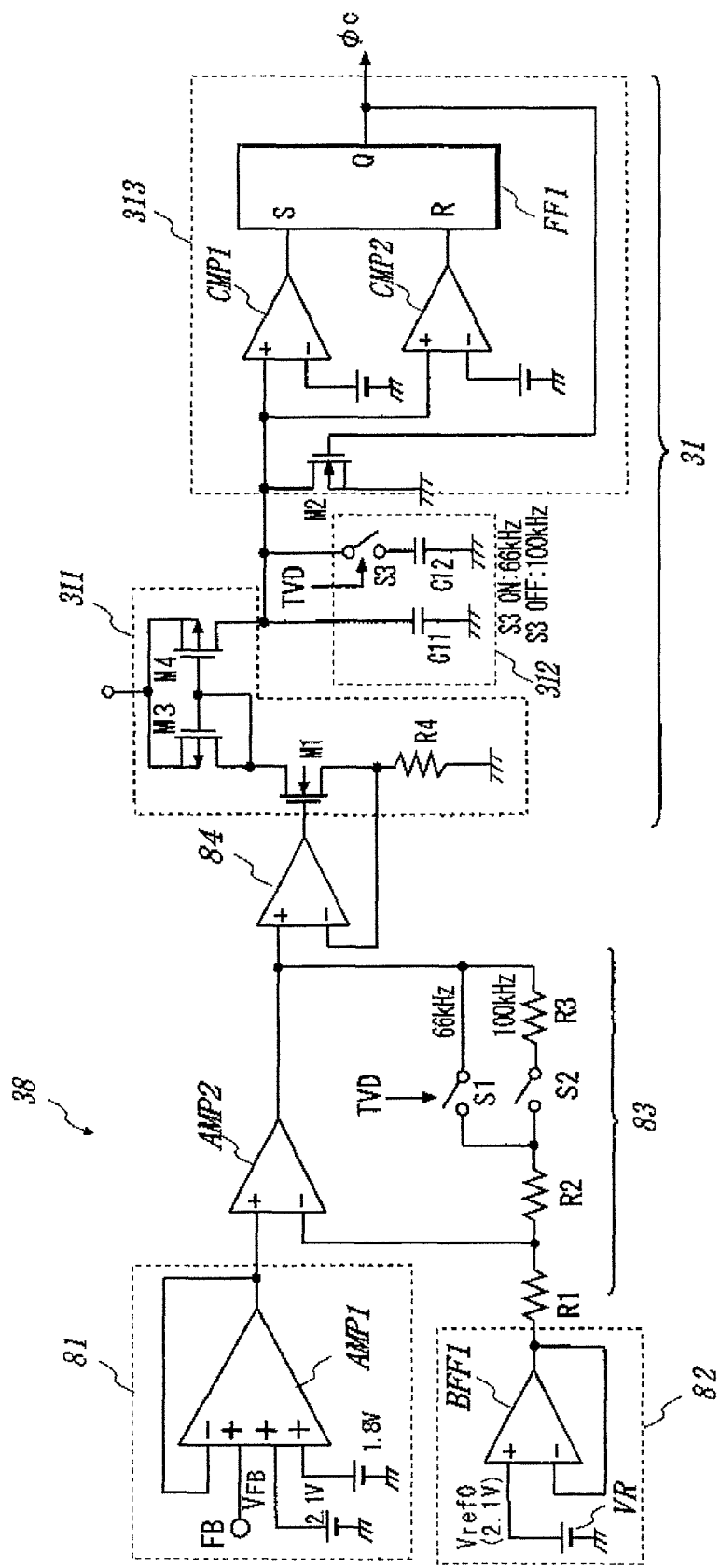
FIG. 5 is a circuit configuration showing a specific circuit configuration of a frequency control circuit in a power supply control IC of the present embodiment.

FIG. 5 shows an example of a configuration of the frequency control circuit 38 composing the power supply control IC 13 according to the present embodiment.

As shown in FIG. 5, the frequency control circuit 38 includes an upper/lower limit clamp circuit 81 which clamps at VFB1 when the voltage VFB of the feedback terminal FB is a predetermined voltage VFB1 (1.8V) or lower and which clamps at VFB2 (2.1V) when the voltage VFB of the feedback terminal FB is VFB2 (2.1V) or higher, a reference voltage circuit 82 which generates a reference voltage Vref0 (for example, 2.1V) corresponding to a point which is to be a start of a linear region VFB1 to VFB2 in the FB voltage frequency characteristics shown in FIG. 4, a non-inverting amplifying circuit 83 which generates a voltage (0.65V to 2.1V/0.45V to 2.1V) in proportion with the voltage (1.8V to 2.1V) which passes the upper/lower limit clamp circuit 81, and a buffer circuit 84 which supplies output of the non-inverting amplifying circuit 83 to the oscillating circuit 31 with the impedance converted.

The oscillating circuit 31 generates an oscillating signal (clock signal φc) at a frequency according to output of the buffer circuit 84.

The frequency control circuit 38 according to the present embodiment is able to switch the amplifying rate of the non-inverting amplifying circuit 83 according to the voltage of the external setting terminal ADJ, that is, the inclination of the straight line in the linear region VFB1 to VFB2 in the FB voltage-frequency characteristics line shown in FIG. 4.

As described above, by being able to select between either of the FB voltage-frequency characteristics A, B shown in FIG. 4, when there is a needs to change the switching frequency to cope with noise or there is a desire to use a small transformer to make the apparatus size smaller, the designer of the power supply device can handle this by simply changing the resistance value of the external resistance Rt connected to the external setting terminal ADJ.

FIG. 4 shows the FB voltage-frequency characteristics from the viewpoint of the power supply control IC 13. Since the feedback voltage VFB corresponds to the load current from the secondary side, it can be said that FIG. 4 shows the load current-frequency characteristics from the view point of the power supply.

As shown in FIG. 5, the upper/lower limit clamp circuit 81 includes a four input differential amplifying circuit AMP 1. When the output voltage of itself is fed back to the inverting input terminal and the voltage VFB of the feedback terminal FB of the power supply control IC is within the voltage range (1.8V to 2.1V) between the clamped voltages VFB1 and VFB2, the upper/lower limit clamp circuit 81 operates as a buffer (voltage follower) which transmits the feedback voltage VFB as is to the non-inverting input terminal side of the non-inverting amplifying circuit 83 used in the later process. The upper/lower limit clamp circuit 81 clamps the voltage to VB1 when the feedback voltage VFB is clamped voltage VFB1 (1.8V) or less and outputs voltage clamped at the VFB2 (2.1V) when the VFB is VFB2 (2.1 V or more).

The reference voltage circuit 82 includes a reference voltage source VR and a buffer (voltage follower) BFF1, and supplies the reference voltage Vref0 (2.1 V) generated in the reference voltage source VR as is to the inverted input terminal side of the non-inverting amplifying circuit 83.

A non-inverting amplifying circuit 83 includes a two input differential amplifying circuit AMP2, an input resistance R1 connected between the reference voltage circuit 82 and the inverted input terminal, feedback resistances R2 and R3 connected in a series between the output terminal and the inverted input terminal, a switch S1 connected parallel with the feedback resistance R3, and a switch S2 connected in series with the feedback resistance R3. The switches S1 and S2 are composed so that either one is selectively turned on by output TVD of the comparator 36c which determines potential of the external setting terminal ADJ. When the switch S1 is turned on, only the R2 is connected as the feedback resistance (amplifying rate is small) and when the switch S2 is turned on, the R2 and R3 are connected as feedback resistances (amplifying rate is large). Specifically, when the potential of the external setting terminal ADJ is lower than 1.25V, the switch S1 is turned on, and when the potential of the external setting terminal ADJ is higher than 1.25V, the switch S2 is turned on.

The resistance value of the resistances R1, R2, and R3 are set so that when either the switch S1 or S2 is turned on, the output voltage of the non-inverting amplifying circuit 83 is Vref0 (2.1V) when the feedback voltage VFB is 2.1V, the output voltage of the non-inverting amplifying circuit 83 is 0.65V when 1.8V is input as the feedback voltage VFB in a state with the switch S1 turned on (66 kHz mode), and the output voltage of the non-inverting amplifying circuit 83 is 0.45V when 2.1V is input as the feedback voltage VFB in a state with the switch S2 turned on (100 kHz mode). When the feedback voltage VFB is within the range of 1.8V to 2.1V, the voltage changing in proportion with the feedback voltage VFB is output from the non-inverting amplifying circuit 83. Then, the output of the non-inverting amplifying circuit 83 is supplied to the oscillating circuit 31 through the buffer circuit 84. The buffer circuit 84 includes a voltage follower.

The oscillating circuit 31 includes a MOS transistor M1 on which output voltage of the buffer circuit 84 is applied on the gate terminal and electric current in proportion with the applied voltage is flown and a resistance R4 as a voltage-electric current converting unit. The voltage converted in the resistance R4 is fed back to the inverting input terminal of the buffer circuit 84 so that the source voltage of M1 becomes the same voltage value as the output voltage of the previous differential amplifying circuit AMP2.

The oscillating circuit 31 includes an electric current source circuit 311 which sends an electric current in proportion with the drain current of the transistor M1, a frequency switch 312 which includes capacities C11 and C12 charged by a current from the electric current circuit 311 and a switch S3 which is turned on or off by output TVD of the comparator 36c connected in series with the C12, and a charge/discharge controller 313 which includes a discharge MOS transistor M2 to discharge charge of the capacitors C11 and C12, two comparators CMP1, CMP2 and a flip-flop FF1.

Then, the output of the flip-flop FF1 is applied to the gate terminal of the discharging MOS transistor M2, the charging and the discharging of the capacities C11 and C12 are repeated to generate the triangular wave inside to output the clock signal with the predetermined frequency. In order to return the drain electric current of the MOS transistor M1, the electric current source circuit 311 includes a current mirror circuit including MOS transistors M3 and M4.

Here, according to the above-described configuration, the drain electric current of the MOS transistor M1 is to be the electric current in proportion with the output voltage of the differential amplifying circuit AMP2 and the output voltage of the differential amplifying circuit AMP2 is to be the voltage according to the feedback voltage VFB. Therefore, the drain electric current of the MOS transistor M1 is to be the electric current according to the feedback voltage VFB.

Therefore, the electric current source circuit 311 passes the electric current according to the feedback voltage VFB. Then, the capacities C11, C12 are charged by the electric current and the triangular waves are generated in the connection node between the connection of M4 with C11, C12. With this, the inclination of the triangular wave changes according to the feedback voltage VFB. As a result, the oscillating signal generated in the oscillating circuit (oscillator) 31 is the frequency according to the feedback voltage VFB.

When the switch S3 is turned on by the output TVD of the comparator 36c, the total capacity value of C11, C12 increases and the oscillating frequency reduces, and when the switch S3 is turned off, the total capacity value of C11, C12 decreases and the oscillating frequency becomes high. By setting the capacity ratio of C11, C12 to, for example, 2:1, the frequency ratio before switching becomes 2:3. This ratio corresponds to 66 kHz and 100 kHz of the upper limit frequency.

FIG. 6 shows a configuration of a gate stop signal generating circuit 40 composing the power supply control IC 13 according to the present embodiment.

As shown in FIG. 6, the gate stop signal generating circuit 40 includes a buffer 41 including a voltage follower which converts the voltage of the external setting terminal ADJ and transmits the above, voltage dividing resistances R5, R6 connected in a series between the output terminal of the buffer 41 and the grounding point, and a comparator 42 which compares the output voltage of the buffer 41 with the voltage VFB of the feedback terminal FB and generates the gate stop signal GSC supplied to the driver 34.

The gate stop generating circuit 40 includes a switch S4 connected between the output terminal of the buffer 41 and the inverted input terminal of the comparator 42 and a switch S5 connected between the connection node N3 of the voltage dividing resistances R5, R6 and the inverting input terminal of the comparator 42.

The above-described switches S4 and S5 are selectively turned on by an output TVD of the comparator 36c which determines the voltage of the external setting terminal ADJ and the signal/TVD inverted by the inverter 43. Specifically, when the voltage of the external setting terminal ADJ is lower than the Vref2 (1.25V) (66 kHz mode), the output of the comparator 36c becomes a high level, the switch S4 is turned on and the output voltage of the buffer 41 is supplied to the comparator 42. When the voltage of the external setting terminal ADJ is higher than the Vref2 (1.25V) (100 kHz mode), the output of the comparator 36c is a low level, the switch S5 is turned on, and the voltage of the connection node N3 is supplied to the comparator 42.

The resistance ratio of the dividing voltage resistances R5 and R6 is set so that R5/(R5+R6) is 1/2.6. The resistance ratio is set to correspond to the ratio of the upper and lower limit values 0.5V, 1.2V of the gate stop mode #2 shown in FIG. 8B with respect to the upper and lower limit values 1.3V, 3.12V of the gate stop mode #3.

With this, when the voltage of the external setting terminal ADJ is lower than 1.25V (66 kHz mode), the voltage (0.5V to 1.2V) of the external setting terminal ADJ is supplied to the comparator 42 as is.

When the voltage of the external setting terminal ADJ is higher than 1.25V (100 kHz mode), the voltage within the range of 0.5V to 1.2V which is the voltage multiplying the voltage of the external setting terminal ADJ by the resistance ratio of the divided voltage resistances R5, R6 (1/2.6) is supplied to the comparator 42.

As a result, the comparator 42 compares the voltage within the range of 0.5V to 1.2V corresponding to the voltage of the external setting terminal ADJ with the feedback voltage VFB regardless of whether the voltage of the external setting terminal ADJ is lower than 1.25V (66 kHz mode) or higher than Vref2 (1.25V) (100 kHz mode). With this, the gate stop signal generating circuit 40 can be implemented by a simple circuit configuration.

FIG. 6 shows a configuration of a circuit of a latch stop control system. The output of the comparator 36d which determines whether the voltage of the external setting terminal ADJ is lower than Vref1 (0.4V) is supplied to the timer circuit 50 which keeps time such as 50 µS. When the output of the comparator 36d continues at a high level for a longer time than the measured time of the timer circuit 50, the output of the timer circuit 50 changes to stop the operation of the driver 34 and to start the latch stop control by the latch stop control circuit 51.

For example, as shown with broken lines in FIG. 6, the above-described external latch stop function can be started by providing a switch S7 and a resistance R7 in a series to be parallel with the external resistance Rt connected to the external setting terminal ADJ and turning on the switch S7 with the micro-computer which controls the power supply system so that the voltage of the external setting terminal ADJ is lower than 0.4V.

FIG. 7 is a configuration of a circuit of a latch stop control system and a relation between a latch stop control system and a gate stop control system.

According to the embodiment of FIG. 7, when the comparator 36d determines that the voltage of the external setting terminal ADJ is lower than Vref1 (0.4V), the operation of the output GATE of the driver 34 is stopped at a low level after 50 µS, the latch stop control circuit 51 is operated and the power supply control IC 13 is advanced to a latch stop mode. According to the embodiment shown in FIG. 7, instead of the constant current IS of the embodiment shown in FIG. 6, a pull-up resistance Rp is provided, and the electric current is passed to the external resistance Rt connected to the external setting terminal ADJ through the Rp to generate voltage according to the resistance value.

As shown in FIG. 7, the latch stop is a function in which the switch S0 provided between the high voltage terminal HV of the IC and the power supply voltage terminal VDD is turned on and off in a comparatively short cycle and with this the voltage of the power supply voltage terminal VDD is suppressed within the range of, for example, 12V to 13V so that the restart of the power supply control IC 13 is prevented. The latch stop control circuit 51 compares the voltage of the power supply voltage terminal VDD with the predetermined voltage (12V, 13V) to perform such control. Specifically, when the voltage of the power supply voltage terminal VDD lowers to 12V, the switch S0 is turned on, and when the voltage of the VDD rises to 13V, the switch S0 is turned off. The above on and off is repeated.

Without such latch stop function, for example, if a CS terminal monitoring circuit which monitors the CS terminal is provided, and this detects abnormalities such as short circuit or open circuit of the CS terminal, to stop the operation of the driver 34, the electric current does not flow in the auxiliary winding and the voltage of the power supply voltage terminal VDD decreases. If the voltage of the power supply voltage terminal VDD becomes equal to or lower than the operation stop voltage value of the IC (for example, 6.5V), a starting circuit (start-up circuit) 52 operates and turns on the switch S0. With this, the IC is restarted and the switching control starts again.

In order to prevent such irrational operation, the latch stop function continues to maintain the gate output stop until a plug is disconnected. According to the present embodiment, the user sets the voltage of the external setting terminal ADJ to a voltage lower than 0.4V so that the latch stop control circuit 51 is forcibly operated to advance the power supply control IC 13 to the latch stop mode. With this, the above-described irrational operation can be prevented. Even if the electric current does not flow in the auxiliary winding, if the switch S0 is turned on, an externally attached capacitor C0 (see FIG. 1) connected to the CS terminal is charged, and since the regulator 53 generates the internal power source voltage Vreg with the charge, the internal circuit of the IC continues to operate.

Since the gate stop signal GSC generated by the gate stop signal generating circuit 40 is not supplied to the latch stop control circuit 51, the latch stop control is not performed in the gate stop by the gate stop signal generating circuit 40.

The gate stop signal generating circuit 40 generates the gate stop signal GSC in a situation such as when the load becomes very light and the feedback voltage VFB is lowered to the region of the gate stop FB voltage adjusting range (see FIG. 4) provided in the region equal to or lower than 1.8V.

In such a light load region, a burst operation is effective, and the operation of the driver 34 is temporarily stopped to output electric power corresponding to the light load.

According to such burst operation, the IC stops oscillating and the output voltage gradually decreases. In response to the above, the feedback voltage VFB rises. With this, the output of the comparator 36c is inverted and the gate control is able to recover automatically. Consequently, the latch stop control should not be performed.

Figure 9:
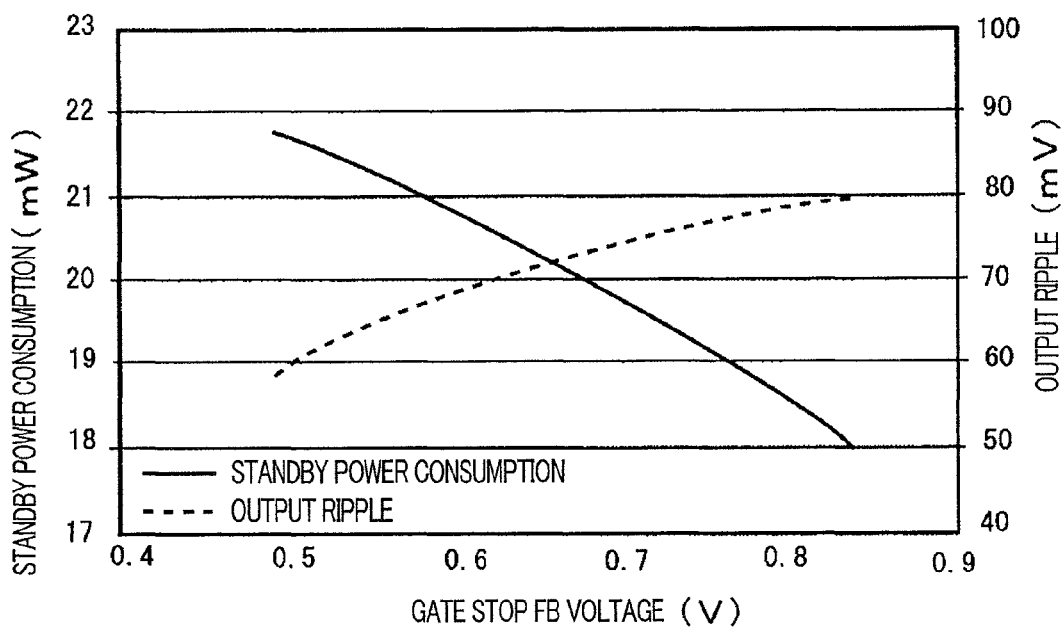
FIG. 9 is a graph showing a relation between a gate stop feedback voltage (gate stop time) and size of standby power consumption and output ripple in a switching type DC power supply device.

According to the switching power supply device of the present invention, in the burst operation, the relation between the standby power consumption against gate stop FB voltage characteristics and the output ripple against gate stop FB voltage characteristics is as shown in FIG. 9. Here, the gate stop FB voltage is in proportion with the gate stop time. Therefore, as the gate stop FB voltage becomes higher, that is, as the gate stop time becomes longer, the standby power consumption decreases but the output ripple increases. On the contrary, as the gate stop time becomes shorter, the output ripple becomes small but the standby power consumption increases. That is, with respect to the gate stop time, a tradeoff occurs between the standby power consumption and the output ripple.

According to the power supply control IC 13 of the present embodiment, the voltage value of the feedback voltage VFB when the gate stop signal generating circuit 40 starts generating the gate stop signal can be set freely with the setting voltage of the external setting terminal ADJ, that is, the resistance value of the external resistance Rt. Therefore, the designer of the power supply device can freely set the voltage value of the feedback voltage VFB when the gate stop function operates at the setting voltage of the external setting terminal ADJ. Therefore, it is possible to freely adjust whether to prioritize the standby power consumption reduction or the output ripple reduction depending on the applied system.

Figure 10:
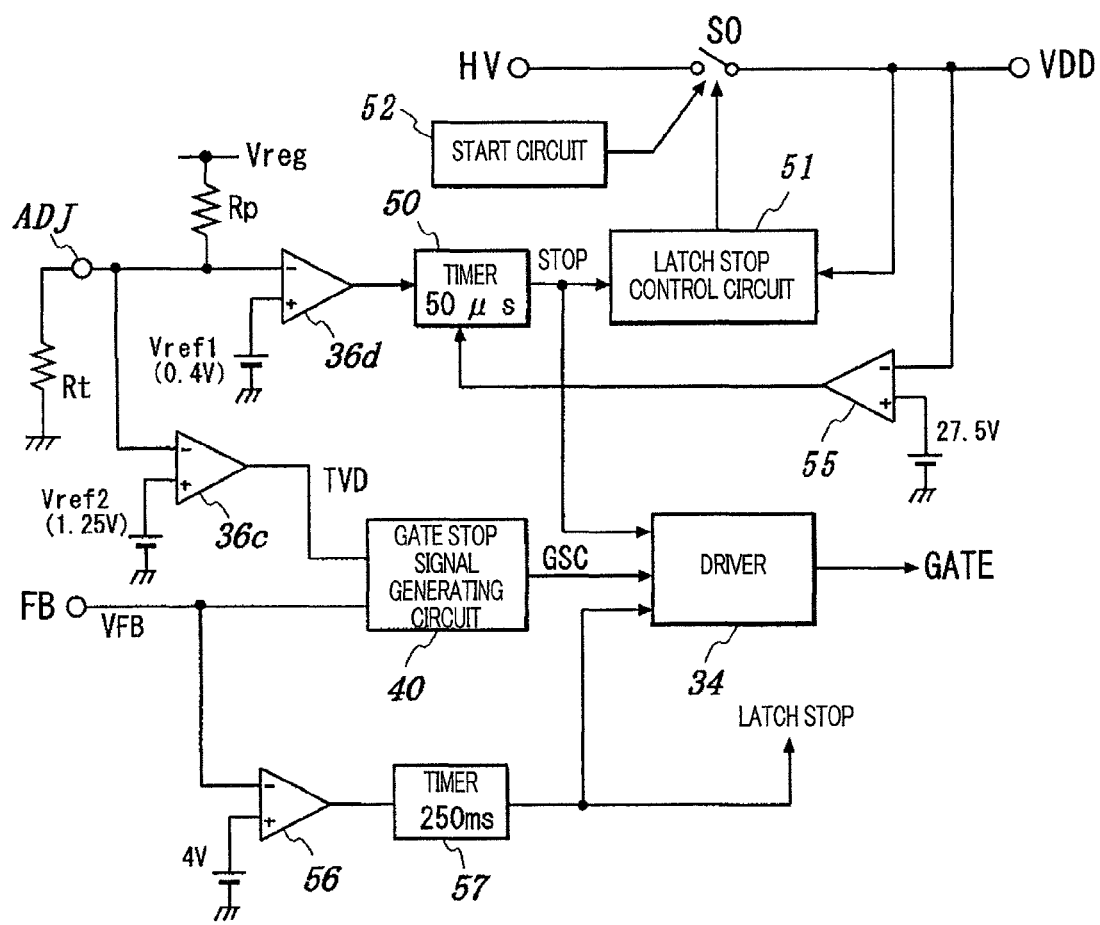
FIG. 10 is a circuit configuration diagram showing a modification of an embodiment shown in FIG. 7.

FIG. 10 shows a modification of the present embodiment.

According to the present modification, in addition to the comparators 36c and 36d to monitor the setting voltage of the external setting terminal ADJ, the modification is provided with an overvoltage detecting comparator 55 which monitors the power supply voltage terminal VDD and determines the overvoltage state which is when the voltage becomes equal to or larger than a setting voltage such as 27.5V, and an overload detecting comparator 56 which monitors the voltage VFB of the feedback terminal FB and determines the overload state which is when the voltage value becomes equal to or larger than a setting voltage such as 4V.

The output of the overvoltage detecting comparator 55 is supplied to the timer circuit 50, common with the comparator 36d, and when the overvoltage state continues for, for example 50 µS or more, the driver 34 is stopped and the latch stop control is started. Moreover, the output of the overload detecting comparator 56 is supplied to the timer circuit 57, and when the overload state continues for, for example, 250 mS or more, the driver 34 is stopped and the latch stop control is started.

The invention by the inventor is described in detail based on the embodiments, but the present invention is not limited to the above-described embodiments. For example, according to the present embodiment, the switching transistor SW which flows electric current intermittently in the primary side winding of the transformer is an element different from the power supply control IC 13. Alternatively, the switching transistor SW can be included in the power supply control IC 13 as one semiconductor integrated circuit.

INDUSTRIAL APPLICABILITY

According to the present embodiment, the present invention is applied to a power supply control IC included in a flyback type AC-DC convertor. The present invention can also be applied to a power supply control IC included in a forward type or pseudo resonation type AC-DC convertor.

DESCRIPTION OF REFERENCE NUMERALS 11 line filter
12 diode bridge circuit (rectifying circuit)
13 power supply control circuit (power supply control IC)
14 secondary side detecting circuit (detecting IC)
15a light emitting side diode of a photo-coupler
15b light receiving side transistor of a photo-coupler
31 oscillating circuit
32 clock generating circuit
34 driver (driving circuit)
35 amplifier (amplifying circuit)
36a overcurrent detecting comparator (overcurrent detecting circuit)
36b voltage/electric current control comparator (voltage/electric current control circuit)
37 waveform generating circuit
38 frequency control circuit
39 duty limiting circuit
40 gate stop signal generating circuit
51 latch stop control circuit (internal power supply voltage control circuit)

The invention claimed is:

1. A semiconductor device for controlling a power supply, wherein the semiconductor device generates and outputs a driving pulse to control on and off of a switching element so that an electric current flows intermittently in a primary side winding of a voltage converting transformer, and wherein the semiconductor device generates the driving pulse according to a voltage in proportion with the electric current flowing in the primary side winding of the transformer and an output detecting signal from a secondary side of the transformer, the semiconductor device comprising:
   a clock generating circuit which is provided with an oscillating circuit in which a frequency can be changed and which generates a clock signal to provide a timing to periodically turn on the switching element;
   a control circuit which provides a timing to turn off the switching element based on the voltage in proportion with the electric current flowing in the primary side winding of the transformer and the output detecting signal from the secondary side of the transformer;
   a setting terminal having a voltage set from outside the semiconductor device;
   a switch provided between a first power supply terminal to which an AC input voltage is supplied and a second power supply terminal to which a voltage induced to an auxiliary winding of the transformer is supplied; and
   an internal power supply voltage control circuit which controls on and off of the switch,
   wherein, when the voltage of the setting terminal is lower than a first voltage value set in advance, the device advances to a first stop mode in which the output of the driving pulse is stopped and the internal power supply voltage control circuit controls the on and off of the switch so that the voltage of the second power supply terminal is within a predetermined voltage range, and when the voltage of the setting terminal is higher than the first voltage value, under a condition that the output detecting signal from the secondary side is lower than a threshold which is the voltage of the setting terminal, the device advances to a second stop mode in which the output of the driving pulse is stopped.

2. The semiconductor device for controlling a power supply according to claim 1, further comprising a frequency control circuit which changes an oscillating frequency of the oscillating circuit according to the output detecting signal from the secondary side, wherein:

the frequency control circuit is configured to change output detecting signal against oscillating frequency characteristics according to the voltage of the setting terminal, in the output detecting signal against oscillating frequency characteristics, an upper limit value of the oscillating frequency for the output detecting signal is fixed to a first frequency when the voltage of the setting terminal is lower than a second voltage value which is higher than the first voltage value, and the upper limit value of the oscillating frequency for the output detecting signal is fixed to a second frequency higher than the first frequency when the voltage of the setting terminal is higher than the second voltage value.

3. The semiconductor device for controlling a power supply according to claim 2, further comprising:

a voltage comparator which compares a voltage corresponding to the output detecting signal with the threshold;

a voltage divider which divides the voltage of the setting terminal; and a selecting unit to selectively supply to the voltage comparator either the voltage of the setting terminal or the voltage divided by the voltage dividing unit as the threshold, wherein, when a ratio of a threshold value of the output detecting signal in the first frequency and the second frequency when advancing to the second stop mode is N, the voltage divider sets a dividing voltage ratio so that the ratio between the voltage divided by the voltage divider and the voltage of the setting terminal is N.

* * * * *